United States Patent
Lunstedt et al.

(10) Patent No.: US 9,371,056 B2
(45) Date of Patent: Jun. 21, 2016

(54) MOBILE-RADIO-BASED ADDITIONAL ELECTRONIC IMMOBILIZER HAVING A DOOR OPENER HAVING A THEFT ALARM

(71) Applicant: Oliver Lunstedt, Berlin (DE)

(72) Inventors: Oliver Lunstedt, Berlin (DE); Sahil Sachdeva, Berlin (DE)

(73) Assignee: OLIVER LUNSTEDT, Berlin (DE)

( * ) Notice: Subject to any disclaimer, the term of this patent is extended or adjusted under 35 U.S.C. 154(b) by 0 days.

(21) Appl. No.: 14/382,799

(22) PCT Filed: Mar. 4, 2013

(86) PCT No.: PCT/EP2013/054243
§ 371 (c)(1),
(2) Date: Sep. 4, 2014

(87) PCT Pub. No.: WO2013/135509
PCT Pub. Date: Sep. 19, 2013

(65) Prior Publication Data
US 2015/0015396 A1  Jan. 15, 2015

(30) Foreign Application Priority Data

Mar. 5, 2012 (DE) .......................... 10 2012 101 836

(51) Int. Cl.
*G08B 13/08* (2006.01)
*B60R 25/01* (2013.01)
(Continued)

(52) U.S. Cl.
CPC ................ *B60R 25/01* (2013.01); *B60R 25/04* (2013.01); *B60R 25/1004* (2013.01); *B60R 25/24* (2013.01); *B60R 25/241* (2013.01);
(Continued)

(58) Field of Classification Search
CPC ...... G05B 15/02; H04B 5/0031; B60R 25/04; B60R 25/1004
USPC ............ 340/545.1, 425.5, 428, 5.61; 307/9.1, 307/10.1; 180/287
See application file for complete search history.

(56) References Cited

U.S. PATENT DOCUMENTS

| 5,939,975 A * | 8/1999 | Tsuria .................... B60R 25/04 340/5.72 |
| 6,028,537 A * | 2/2000 | Suman .................... B60R 25/04 340/426.14 |

(Continued)

FOREIGN PATENT DOCUMENTS

DE   102005034117   3/2006
FR   2771982        6/1999

OTHER PUBLICATIONS

Oliver Luenstedt: "Carzapp—Power Point Presentation", Ecosummit—ECO12 Düsseldorf, Mar. 22, 2012, XP002696946, Gefunden im Internet: URL:http://ecosummit.net/uploads/eco12_141112_1150_oliverluenstedt_carzapp.pdf [gefunden am May 14, 2013].

*Primary Examiner* — John A Tweel, Jr.
(74) *Attorney, Agent, or Firm* — Mark M. Friedman

(57) ABSTRACT

The present invention relates to a device and a method for an additional electronic immobilizer (10) having a door-opener and theft-alarm function for a vehicle, comprising: a) a microcontroller; b) a mobile radio interface (1); c) a second interface (2) to a central locking system for doors of the vehicle; d) a near-field radio interface (3) such as RFID or NFC; e) a smart relay interface (4) for transmitting a control signal (S1) for a smart relay (8) and for receiving a receiving signal (S2) of the smart relay (8).

14 Claims, 2 Drawing Sheets

(51) Int. Cl.
*B60R 25/10* (2013.01)
*G05B 15/02* (2006.01)
*H04B 5/00* (2006.01)
*B60R 25/04* (2013.01)
*B60R 25/24* (2013.01)
*H04L 29/08* (2006.01)
*H04W 4/00* (2009.01)
*H04W 4/04* (2009.01)

(52) U.S. Cl.
CPC ............... *G05B 15/02* (2013.01); *G08B 13/08* (2013.01); *H04B 5/0031* (2013.01); *H04L 67/125* (2013.01); *H04W 4/008* (2013.01); *H04W 4/046* (2013.01)

(56) References Cited

U.S. PATENT DOCUMENTS

| | | | |
|---|---|---|---|
| 6,664,888 B1* | 12/2003 | Bishop | B60R 25/04 307/10.1 |
| 6,812,829 B1* | 11/2004 | Flick | B60R 25/04 180/287 |
| 7,173,348 B2* | 2/2007 | Voda | B60R 25/04 307/10.2 |
| 7,272,469 B2* | 9/2007 | Kalau | B60R 25/04 340/426.1 |
| 7,667,580 B2* | 2/2010 | Tauchi | B60R 25/04 340/426.1 |
| 2003/0150416 A1* | 8/2003 | Flick | B60R 25/04 307/10.6 |

* cited by examiner

MOBILE-RADIO-BASED ADDITIONAL ELECTRONIC IMMOBILIZER HAVING A DOOR OPENER HAVING A THEFT ALARM

The present invention relates to an additional electronic immobilizer with a cellular radio interface and a near field radio interface by means of which the additional immobilizer can be activated or deactivated, respectively. Via an interface to a central locking system, doors can be closed or opened. As contact-breaker relays integrated in the vehicle, a smart relay and preferably a radio relay are actuated, the smart relay being monitored for bridging of its contact-breaker points and for disconnection, which would lead to a theft alarm.

Due to the rise of new car sharing and car renting firms, novel concepts for securing against vehicle theft are required, also with regard to the possibility of a key remaining in the vehicle.

The car sharing company Flinkster of the Deutsche Bahn (German Railways), for instance, provides a system and a method with which the vehicle key remains in the vehicle and, in addition, an immobilizer system with door opening and closing function is integrated in the vehicle. The immobilizer has a cellular radio interface to a server background system by means of which a release code is transmitted to the immobilizer before driving. Via an RFID interface, the vehicle can be opened with a personalized RFID chip by the driver after a release has been transmitted by cellular radio by means of a release code. The release code comprises the release for the personalized RFID chip of the driver. If the RFID chip released in the immobilizer system is held at a specific part of the vehicle, this can be detected and the driver's door is opened. In addition, the immobilizer has a contact-breaker relay for interrupting or releasing, for instance, the ignition or the like. The immobilizer system is preferably integrated in specific vehicle types to which the immobilizer is adapted, for instance by the possibility of easily connecting an ignition or start breaker at a specific site in the vehicle, however ensuring a good theft protection due to the fact that the immobilizer communicates with the engine control electronics of the vehicle via a vehicle bus, where the vehicle bus cannot be easily bridged by a thief. An integration of a similar immobilizer in any other vehicle, such as, for instance, private vehicles, would be problematic since a breaker relay that can be easily installed would be easy to follow and to bridge and since vehicle bus connections differ greatly from vehicle type to vehicle type and since, in addition, a special release by the manufacturer would be necessary for a connection.

A different concept of the immobilizer in car sharing or car renting is described in U.S. Pat. No. 7,538,655 B1, where the immobilizer is also released via a hand-held radio device for a certain time in a first stage by transmission of a code, the doors being opened and the breaker relay deactivated if the RFID chip approaches the immobilizer. Here as well, however, there is the danger that the breaker relay can easily be found and bridged by a thief through the cabling. To release the immobilizer through the code via the hand-held radio device, the respective code must first be inquired by telephone from the car sharing firm. A server-based solution, where the customer requests a release by mobile phone via a data connection and the release of the vehicle is automatically performed, is desirable, but not envisaged.

FR 2 771 982 A1 discloses an electronic immobilizer with an integrated breaker relay which is also connected to an external radio network via a radio module so as to receive control signals or send vehicle signals. In addition, via the electronic immobilizer, external light and braking signals, a video camera and a microphone evaluated by the electronic immobilizer and control signals are emitted e.g. to door openers.

DE 10 2005 034 117 A1 discloses a monitoring system, e.g. for an immobilizer, where a monitoring signal is transferred via the battery line or a power supply line for actuating a breaker relay.

Above all, there is an increased risk of theft in larger associations for car sharing vehicles, the individual locations of which could be found out by a thief, and where in addition the vehicle key remains in the vehicle for the next driver. Companies or individuals who can for instance participate in a car sharing firm with their vehicles, are aware of this risk. Above all, if it is desired to integrate any non-specific vehicle types in a car sharing concept, a suitable immobilizer in addition to the ignition switch should meet the following requirements: a) be able to be readily integrated in and adaptable to different vehicle types, b) be able to be built into the vehicle with little effort, and therefore inexpen-sively, c) guarantee high security, and d) be able to send a theft alarm, if possible, in spite of an activated additional immobilizer, if the engine is started. Often, currently known additional immobilizers must be integrated with great effort and a high wiring length if the breaker relay is not to be found easily along a wiring. In addition, it would also be advantageous, with a view to ever increasingly multifunctional use of cell phones and smart phones, to be able to use them also for opening and closing vehicle doors.

SUMMARY OF THE INVENTION

It is therefore an object of the invention to overcome the drawbacks of the state of the art and create an additional immobilizer which has a cellular radio interface for its activation or deactivation and which can be integrated with as little effort as possible and at the same time detects non-allowed bridging of a breaker relay for starting the engine, causing a theft alarm.

The above-mentioned objects and other objects to be gathered from the specification are achieved by an additional electronic immobilizer system and a corresponding method according to the feature combination of the independent Claims 1 and 13, respectively.

Other advantageous features and embodiments of the invention are indicated in the dependent Claims 2-12 and 14-15, respectively.

Advantageously, a release of the additional immobilizer and door opening of the vehicle can be performed by a simple call or by a data connection from a cell phone. For this purpose, a customer simply needs to call a server background system with his cell phone or establish a data connection, where preferably his ID or a code is verified, in case of a positive verification result a release signal being immediately sent to the additional immobilizer via its cellular radio interface. Access via a direct data or telephone connection between the cell phone and the additional immobilizer is also possible. This means that an additional near field radio communication chip, such as an RFID or NFC chip, is no longer necessary.

Another advantage is monitoring of a state of a smart relay as a breaker relay which is connected to the additional immobilizer preferably by wiring and can therefore also be found, if desired. If the smart relay is found and bridged or disconnected, the immobilizer recognizes a change in state of the smart relay and a theft alarm is released. Preferably, the theft alarm can be transmitted via the cellular radio interface, for instance to an owner of the vehicle or to a server background system.

Preferably, a GPS position detection module, for instance, is also integrated in the additional immobilizer, so that in case of a theft alarm, position data can be transferred at the same time and the vehicle can be followed. Preferably, an acceleration sensor is also integrated in the additional immobilizer which detects a pulling or tearing on the additional immobilizer, also causing an early theft alarm. This makes bridging of the breaker relay or the smart relay much for difficult for a thief, which will get about and reduce the theft rate.

A connection of a wireless breaker relay or radio relay to the additional immobilizer for making it particularly difficult for the thief to follow connecting wires and find the wireless breaker relay is also of a particular advantage. Also, an integration of the wireless breaker relay is much easier and faster to perform than an integration of a wired breaker relay, saving time and thus installation costs. In conventional additional immobilizers, on the other hand, the installation costs of the additional immobilizer system with the corresponding wired breaker relays can frequently be higher than the costs of the additional immobilizer itself.

Ideally, the smart relay would also be connected wirelessly to the additional immobilizer, leading to both advantages: a) easier installation of the smart relay with substantially reduced installation costs, and b) making it more difficult for the thief to find it.

Other preferred and advantageous features of the invention are disclosed by the independent claims and by the dependent claims.

A preferred embodiment according to the invention is shown in the subsequent drawings and in a detailed description, but is not intended to limit the present invention thereto.

SHORT DESCRIPTION OF THE DRAWINGS

DETAILED DESCRIPTION OF A PREFERRED EMBODIMENT

Figure 1:
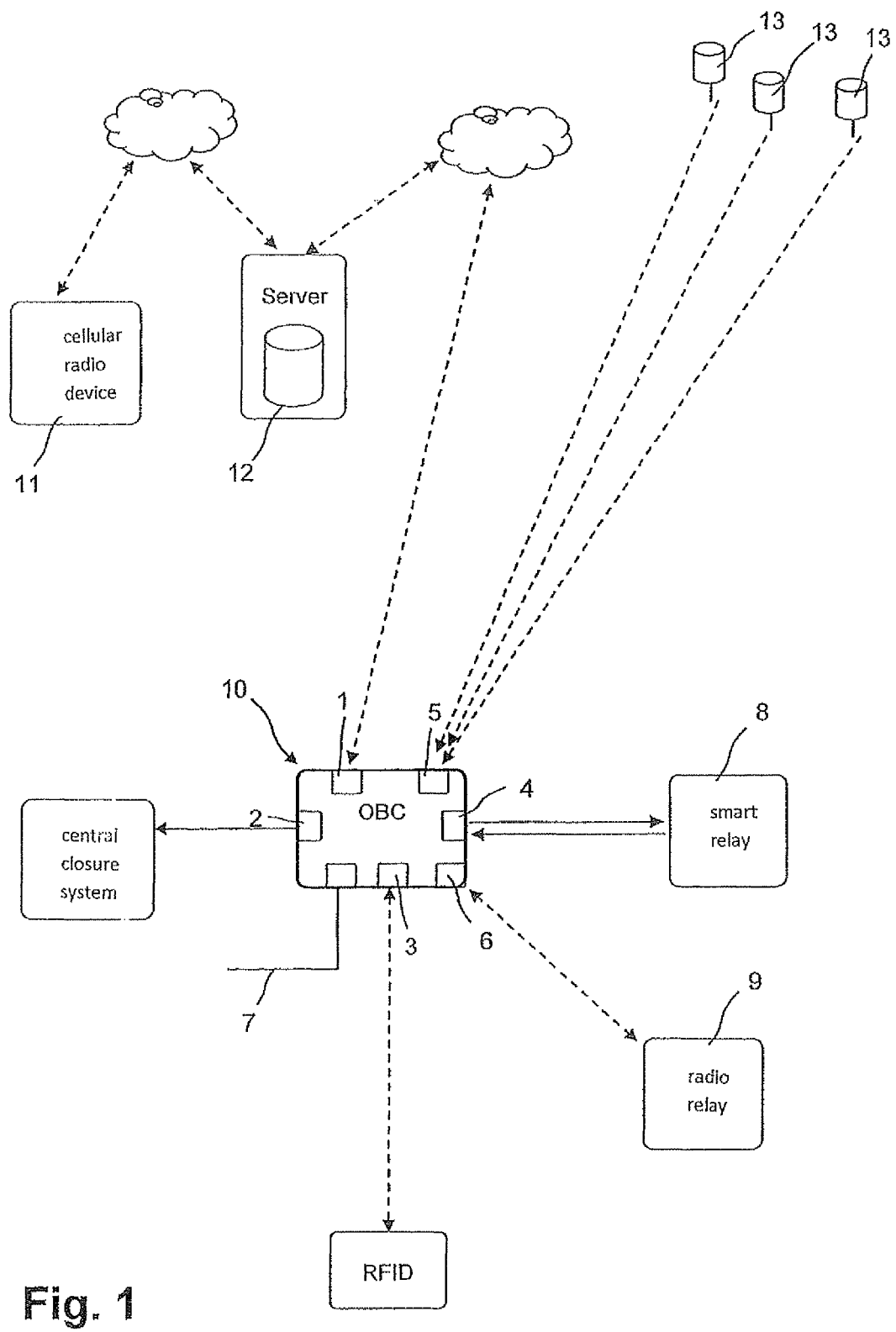
FIG. 1 shows a system overview of an electronic immobilizer with its interfaces, e.g. a cellular radio interface to a server background system, an interface to a central closure system, to a vehicle bus, to a near field communication system, to a wireless relay, to a smart relay and to a position radio reception module.

FIG. 1 shows a system overview of a vehicle release or vehicle immobilizer, respectively, within the framework of a car sharing concept, having an additional immobilizer 10, wherein the additional immobilizer 10 is installed in a vehicle and preferably communicates with an external server background system 12 via an integrated cellular radio interface 1. The additional immobilizer 10 comprises various other interfaces with the vehicle, for instance with at least one connected breaker relay installed in the vehicle, and through an interface with a central closure system. The cellular radio interface 1 in the additional immobilizer 10 has either an integrated or an external antenna for receiving a cellular radio signal and preferably establishing data communication with the server background system 12. With data communication, e.g. a release signal or an immobilization signal can be transmitted to the additional immobilizer 10, but vehicle data, such as tanks filling level, position, battery status etc. can also be sent back to the server background system 12. For the sake of conciseness, the additional immobilizer (10) which functions in addition to an ignition lock with ignition key or to a RFID key will be simply called immobilizer (10) in the following, but is always to be understood in addition to a standard immobilizer in the vehicle.

The server background system 12 is preferably linked to a relational database in which all vehicles are registered, e.g. with reference to an owner and different authorized drivers. In a preferred car sharing concept, drivers, also called customers, can contact a car owner and ask him for permission to use his vehicle. If usage is permitted, the name of the customer is registered in the database and authorized for future leases. Preferably, leasing times can be reserved in advance, certain customers or the lessor himself can be prioritized, an invoice can be sent etc. If, for example, a lease has been reserved, and the customer stands before the vehicle, he will preferably either send an SMS to the server background system 12 with a cell phone device 11 or establish a different type of connection with the server 12, wherein the server background system 12 will then verify the customer in combination with the vehicle to be rent and then send a release signal to the immobilizer 10 in the vehicle via the cellular radio interface 1, whereupon the immobilizer 10 will preferably open the driver's door and deactivate the immobilization function in the vehicle, i.e. release the vehicle. Since the vehicle key is deposited at a known location in the vehicle, the customer can then start the engine and drive. At the end of the ride, another signal will be sent to the server background system 12, whereupon in the database preferably an end of the ride and possibly a position of the vehicle will be registered. Subsequently, the server background system 12 will send the immobilization signal to the immobilizer 10 of the vehicle, whereupon the immobilizer 10 in the vehicle will actuate a closure of the doors and an activation of the at least one breaker relay. Direct communication between the cellular radio device 11 and the immobilizer 10 is also conceivable, where for instance a specific code must be transmitted as a release or immobilization signal. Many different types of communication between the immobilizer 10 and the server background system 12 with a data exchange for release or blocking of a customer, a vehicle or the like are well-known and possible, for which the electronic immobilizer 10 according to the present invention can be used.

The immobilizer 10 according to the invention is substantially based on a micro-controller control system with a micro-controller and a memory which is connected to the micro-controller either integrally or externally, the micro-controller control system comprising a specific sequential program, being in connection with different interfaces and monitoring in particular at least one breaker relay, also called smart relay (8), for non-allowed bridging. The term "smart relay" refers to a breaker relay characterized preferably in that it comprises electronics for monitoring non-allowed bridging and/or a disconnection of the breaker relay.

The immobilizer 10 has a second interface 2 with a central closure system by means of which doors, such as the driver's door, can be opened or closed by respective control signals. The second interface 2 can be, for instance, a voltage or a current interface with an opening or closing valve, a CAN bus interface, an ODB2 interface or a different interface.

Figure 2A:
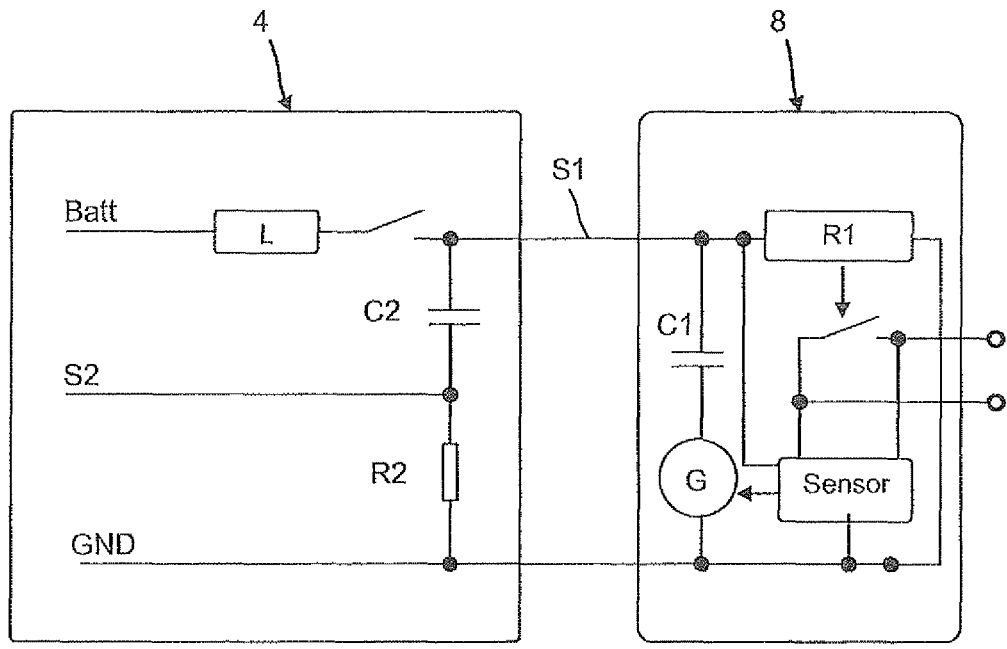
FIG. 2a shows a schematic drawing of a preferred smart relay interface of the electronic immobilizer connected to a preferred smart relay.
Figure 2B:
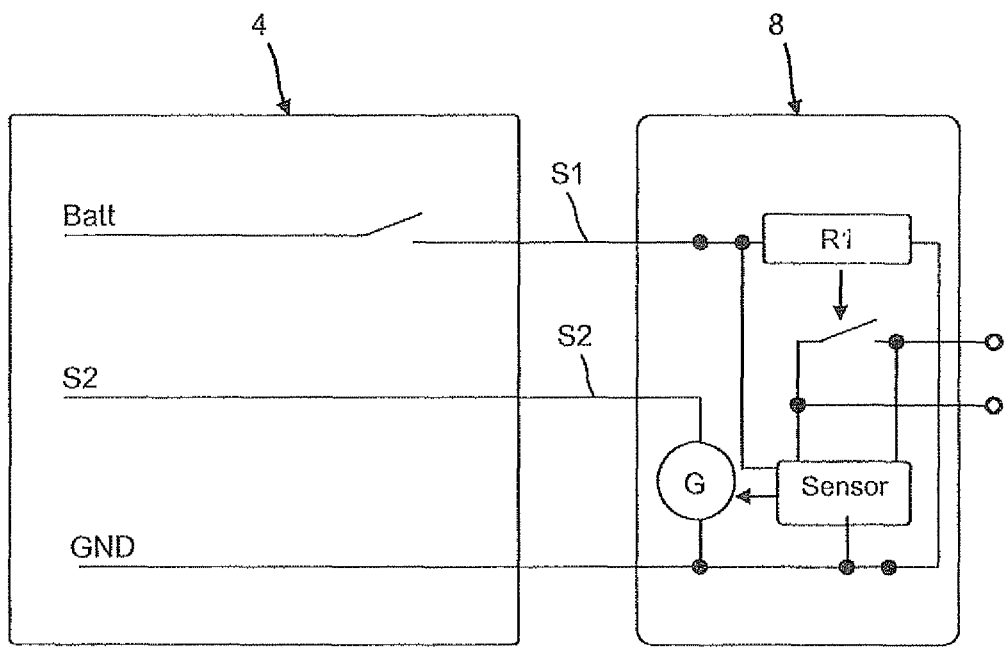
FIG. 2b shows another schematic drawing of another preferred smart relay interface of the electronic immobilizer connected to another preferred smart relay, wherein the connection comprises a separate line for a receive signal.

Furthermore, the immobilizer 10 has a smart relay interface 4 via which a control signal S1 can be transferred to the smart relay 8 and a receive signal S2 from the smart relay 8 can be received. Preferably, the receive signal S2 from the smart relay can be a signal which, as shown in FIG. 2*a*, is either re-transferred on a control line via which the control signal S1 has also been sent, or a separate line can be provided for the receive signal S2, as shown for instance in FIG. 2*b*. Other possibilities, for instance a modulation or superimposition of the receive signal S2 on a battery line connected on site to the smart relay 8, are also conceivable so that the receive signal S2 would be detectable via the battery supply voltage of the immobilizer 10. It is also conceivable to transmit the receive signal S2 to the smart relay interface 4 wirelessly. According to the invention, the receive signal S2 from the smart relay 8 and in dependency on the signals at the contact-breaker points which are connected with the vehicle or e.g. with the fuel pump or the ignition, will be in connection. During this process, preferably small currents are fed into the respective contact so that by a voltage measurement at the respective contact, it can be determined whether the contact from lines connected at the exterior which have certain resistances and capacitance values to the battery voltage Batt or to the ground GND, has e.g. been interrupted or whether the contacts have suddenly been shunted out or connected to other lines.

Preferably, the smart relay 8 has a sensor circuit for monitoring at least one of the breaker contacts, with one or more of the following parameters being monitored or measured: a voltage, a current, an impedance and/or a reactance to the ground (GND) or to the battery supply (Batt) or between two of the breaker contacts, or a signal.

It is also conceivable to additionally use DMS sensors in the smart relay 8 which can detect whether there is mechanical stress on the smart relay 8, for instance by bending or extracting of a contact.

FIG. 2*a* shows a simple, preferred circuit system of the smart relay interface 4 where the control signal S1 is transmitted by switching a battery voltage Batt with a serially arranged inductance L and is transmitted to the smart relay 8. By serial arrangement of the inductance L to the battery voltage Batt, substantially only a DC signal is transmitted to the smart relay 8. In the smart relay 8, with the sensor circuit "sensor" present therein, the state of the respective breaker contact or the turning-on from the outside with the respective breaker contact are measured and transformed by a generator G into a generator signal which is coupled with the control signal S1 by a first condenser C1. The generator signal overlaid over the control signal S1 is received by the smart relay interface 4 and uncoupled as the receive signal S2 by a simple R2C2 filter circuit. Other transmission possibilities are also conceivable for the generator signal, for instance via an additional line or additional radio transmission.

Preferably, the receive signal S2 is transformed into a digital signal by an analog-to-digital converter and evaluated by the micro-controller control system. An evaluation can take place by means of the micro-controller, for instance, by measuring an initial state corresponding to a certain signal strength, and by monitoring or analyzing the further process over time. If, for instance, an alteration is registered within a short time interval which exceeds a certain limit, this is interpreted as a non-permissible state which preferably leads to a theft alarm via the micro-controller control system. By determining an initial receive signal S2 and/or by learning permissible alterations of the receive signal S2 and by storing respective limit values, the immobilizer 10 can easily be adapted both for different vehicle types and for different types of cabling from vehicle to vehicle. However, the receive signal S2 can also be evaluated by an electronic system in the smart relay interface 4 so that a preprocessed and preferably binary receive signal S2 can be evaluated by the micro-controller control system so as to save computing capacity and power. Also, preferably the micro-controller control system can be e.g. awakened by a detecting unit responsible for pre-processing of the receive signal S2 and detecting a change in state or a non-permissible change in state.

The theft alarm can be either an open theft alarm, such as a honking, a flashing of the car lights, where control takes place e.g. via a vehicle bus, or the theft alarm is processed as an alarm not visible on the outside, e.g. by transmitting a cell phone signal to the server background system 12. In case of theft alarm, position data and other vehicle data can also be transmitted to the server background system 12. Other theft alarm processes, such as a reduction in vehicle performance and the like, are also conceivable.

A different detection of the state of the smart relay contacts is conceivable as well, for instance by measuring a capacity against the ground or against the battery voltage Batt at the respective breaker contact. Preferably, in this case, the transmitted control signal S1 can be a voltage signal and the signal S2 to be received a current signal, or the transmitted control signal S1 can be a current signal and the signal S2 to be received a voltage signal.

It is also conceivable to construct the smart relay interface (4) as a wireless interface, which has the advantage that in this case the smart relay 8 is much harder to find by a thief.

Preferably, the immobilizer 10 also comprises a vehicle bus interface 7, e.g. a CAN bus interface or an OBD-2 interface. Via the vehicle bus interface 7, the immobilizer 10 can preferably forward the release or immobilization signal to an engine control unit which is an immobilizer of a vehicle manufacturer. Also, e.g. the theft alarm can be transferred via the vehicle bus interface 7 or the car lamps can be switched into a flash modus. Also, preferably the doors can be opened or closed via the vehicle bus interface 7. Also, preferably activities within the vehicle can be detected via the vehicle bus interface 7, such as starting of the engine, seat displacement signals, door opening and light signals as they occur before or during driving. If such activities are signaled to the immobilizer 10 via the vehicle bus interface 7 or via other signal lines, a theft can also be detected in the state of an activated immobilizer and theft alarm can be released.

The immobilizer 10 furthermore has a near field radio interface 3, e.g. an RFID, NEC or Bluetooth interface, for enabling a fall-back solution for the customer or driver for opening or closing the vehicle. If there is no cell phone connection and the car is closed, it can then be useful to take the vehicle keys out of the car. Preferably, the immobilizer 10 can also be locked or unlocked via the near field radio interface 3 or the near field radio signal, respectively. A specific code transmission with the near field radio signal leads to an authorization or release of the immobilizer. The respective aerial interface can be placed e.g. in the immobilizer 10 or externally behind the windscreen.

Preferably, the immobilizer 10 also comprises a position receiving module 5, e.g. a GPS or a Galileo module, for receiving a position signal from satellites 13 via a respective additional aerial interface. The received position signals are preferably transmitted to the server background system 12 during data communication, e.g. to communicate to the next authorized customer a precise current parking position. Preferably, the position receiving module 5 also comprises a dead reckoning, which, is integrated or external. However, determining the position data of the vehicle is also possible via a terrestrial cellular radio signal localization. Preferably, in case of a theft alarm, the position data are also transmitted to the server background system or to others.

In this context, it should also be mentioned that, even if the modules and interfaces described herein are mentioned separately, a greater integration is conceivable as well; for instance, the dead reckoning module can be contained either in the position receiving module 5 or in the micro-controller control system, or the micro-controller system can e.g. be part of a high-performance cellular radio module.

Another preferred embodiment of the immobilizer 10 has an additional radio relay interface 6 for communication with a radio relay 9 which is connected to the micro-controller control system, in a similar way as the smart relay interface 4. The radio relay interface 6 has a respective radio module with an additional respective aerial interface, the respective radio module sending a radio signal which can be received by the radio relay 9. Preferably, but not necessarily, the communication between the radio relay interface 6 and the radio relay 9 is bidirectional so that sensor monitoring can also be performed and a signal concerning the state of the breaker contacts in the radio relay 9, in a similar way to the smart relay 8, can be sent back. For the radio relay 9, the sensors preferably have the same possibilities as for monitoring the breaker contacts, as described for the smart relay 8. The only difference is that the sensor or generator signal is not transmitted via the signal line but wireless, or via feeding or superimposition on the battery voltage supply towards the immobilizer 10, and it is detected and evaluated or monitored there as a respective receive signal S2.

Via the radio relay interface 6, the radio relay 9 is actuated, i.e. enabled or disabled, according to the respective release signal or immobilization signal detected in the micro-controller control system.

Preferably, the cellular radio interface 1 is equipped with a GSM/GPRS cellular radio module; however, other cellular radio modules, e.g. based on UMTS, LTE, CDMA, WIFI, WIMAX are conceivable as well.

A preferred embodiment of the immobilizer 10 also has an acceleration sensor with which, if the immobilizer is activated, it can e.g. be determined whether the car has been broken into or whether someone tries to lever out the immobilizer 10, so that in this case an early theft alarm can be released.

A cellular radio device can be e.g. a cell phone, a smart phone or another device by means of which a telephone or Internet connection can be established.

Other possible embodiments are described in the following Claims.

The reference numbers in the Claims are given for better comprehensibility, but do not limit the Claims to the embodiments indicated in the figures.

REFERENCE NUMBERS 1 cellular radio interface
2 second interface (to a central closure system)
3 near field radio interface
4 smart relay interface
5 position receiving module
6 radio relay interface
7 vehicle bus interface
8 smart relay
9 radio relay
10 immobilizer
11 cellular radio device
12 server background system
13 satellite
R1, R2, C1, C2, sensor, G, L circuit components
Batt, S1, S2, GND line

What is claimed is:

1. Immobilization system with door opening and theft alarm function for a vehicle, comprising:
    an electronic immobilizer having a smart relay interface via which a control signal is transmitted and a receive signal is received, and
    a smart relay devised as a breaker relay for receiving the control signal transmitted by the electronic immobilizer and for transmitting the receive signal to the electronic immobilizer,
    wherein the smart relay
    is arranged outside the electronic immobilizer,
    comprises an internal breaker relay with breaker contacts which are electrically guided to the outside,
    is devised to activate the internal breaker relay by means of the control signal which is activating, and to deactivate the breaker relay in case of the control signal which is deactivating, and
    comprises sensor electronics which by measuring monitor at least one of the breaker contacts and from there generate the respective receive signal, wherein one or more of the following parameters as a voltage, a current, an impedance or a reactance to the ground or to the battery supply or between two of the breaker contacts or a signal being measured, in order to be able to recognize during measurement a non-permissible state caused by bridging or by a disconnection of the breaker contacts guided to the outside;
    the electronic immobilizer further comprising:
    a) a micro-controller control system, comprising a micro-controller and a memory which is connected to the micro-controller integrally or externally, the control signal and the receive signal being connected to the micro-controller,
    b) a cellular radio interface with a cellular radio module for transmitting and receiving a cellular radio signal via an aerial interface, the cellular radio module being connected to the micro-controller control system,
    c) a second interface with an outgoing closure system control signal to a central closure system for doors of the vehicle, the second interface being connected to the micro-controller control system, and
    d) a near field radio interface with a near field radio module for receiving a near field radio signal via an additional aerial interface, the near field radio module being connected to the micro-controller control system,
    e) the micro-controller control system being adapted as follows:
    to keep the cellular radio interface and the near field radio interface ready-to-receive in order to receive data,
    in case of receipt of an immobilization signal by the cellular radio interface or by the near field radio interface, to activate an immobilization function,
    in case of detection of a release signal by the cellular radio interface or the near field radio interface, to deactivate the immobilization function,
    with activated or deactivated immobilization function, to transmit the corresponding closure system control signal and the corresponding control signal to the external smart relay, the corresponding control signal being activating or deactivating,
    to monitor the receive signal in terms of a change into a non-permissible state and to trigger a theft alarm if the non-permissible state is detected.

2. Immobilizer system according to claim 1, the electronic immobilizer further comprising a position receiving module which is a GPS module, a Galileo module or another position receiving module which receives a position signal via a fifth aerial interface and processes it or forwards it to the micro-controller control system in non-processed form.

3. Immobilizer system according to claim 1, the electronic immobilizer also comprising a radio relay interface which is connected to the micro-controller control system and has a corresponding radio relay aerial interface which can be connected to a radio relay, and the micro-controller control system being additionally devised so that with detection of the release or the immobilization signal, a corresponding release or immobilization signal is transmitted to the radio relay via the radio relay interface.

4. Immobilizer system according to claim 3, where a radio signal can be received from the radio relay via the radio relay interface, which transmits a state of the radio relay, and where the micro-controller control system is additionally devised such that the radio signal which can be received from the radio relay interface is evaluated in terms of the state of the radio relay and such that in case of a detected non-permissible change of state of the received radio signal, a theft alarm is triggered.

5. Immobilizer system according to claim 4, further comprising a breaker relay in addition to the smart relay for creating an additional immobilizer at a suitable place in the vehicle.

6. Immobilizer system according to claim 1, the smart relay interface being a wire-bound electric interface via which the control signal is transmitted to the smart relay and the receive signal from the smart relay can be received.

7. Immobilizer system according to claim 6, the control signal transmitted via the smart relay interface being a voltage signal and the receive signal being a current signal or the control signal being a current signal and the receive signal being a voltage signal.

8. Immobilizer system according to claim 1, the smart relay interface being a wireless interface, where a correspondingly encoded control signal is transmitted to the smart relay and another correspondingly encoded receive signal from the smart relay can be received.

9. Immobilizer system according to claim 1, the second interface being a vehicle bus interface, a CAN bus interface or an OBD-2 interface.

10. Immobilizer system according to claim 1, the electronic immobilizer further comprising a vehicle bus interface which is a CAN bus interface, an OBD-2 interface or a different vehicle bus interface, the micro-controller control system being additionally devised so that via the vehicle bus interface, activities in the vehicle can be detected, such as starting of the engine, seat displacement signals, light signals or other activities that take place before or during driving, and so that, if such an activity is detected in spite of an activated immobilizer function, the theft alarm is triggered.

11. Immobilizer system according to claim 1, the micro-controller control system being additionally devised so that in case of a theft alarm, a corresponding cellular radio signal is transmitted via the cellular radio interface, wherein, if current or stored position data are present, they are transmitted as well.

12. Method for radio-controlled activation and deactivation of an immobilization function in an immobilization system according to claim 1, wherein for the immobilization system, an electronic immobilizer is provided in combination with a smart relay, the electronic immobilizer has a micro-controller control system which is in connection with the smart relay via an outgoing control signal and an incoming receive signal, the smart relay is a breaker relay arranged outside the electronic immobilizer which can be actuated by the control signal of the electronic immobilizer, the smart relay in addition comprises sensor electronics, where the sensor electronics monitor at least one of the breaker contacts by a measurement and the corresponding receive signal is generated therefrom, where with the measurement one or more of the following parameters as a voltage, a current, an impedance or a reactance to the ground or to the battery supply or between two of the breaker contacts or a signal, are measured, for being able to recognize during measurement a non-permissible state due to bridging or due to disconnection of the breaker contacts guided towards the outside, and the method comprising the following steps:

a) establishing a ready-to-receive of a cellular radio interface and a near field radio interface in the electronic immobilizer for receiving a release signal or an immobilization signal, b) with detection of the release signal in the electronic immobilizer deactivation of the immobilization function in the electronic immobilizer, and transmission of the respective control signal for deactivation of the smart relay in order to deactivate its breaker relay, and transmission of a closure system control signal for door opening to a closure system in the vehicle, starting from the micro-controller control system and via a second interface of the electronic immobilizer, c) with detection of the immobilization signal in the electronic immobilizer, activation of the immobilization function, and transmission of the respective control signal for an activation of the smart relay in order to activate its breaker relay, and transmission of a respective closure system control signal for door closing to the closure system, d) monitoring of the receive signal by the electronic immobilizer and determining whether in the receive signal, there is a change into the non-permissible state, and e) with detection of a change of the receive signal S2 into the non-permissible state, triggering of a theft alarm and transmission of a respective message via the cellular radio interface and included transmission of position data, if any.

13. Method according to claim 12, where for the immobilization system a separate radio relay is provided in addition and where the radio relay is activated by the electronic immobilizer in step c) and accordingly deactivated in step d).

14. Method according to claim 12, where the receive signal is overlaid on the control signal by the sensor electronics of the smart relay and the receive signal is accordingly detected by the electronic immobilizer, and/or where the electronic immobilizer is wirelessly in contact with the smart relay by radio.

* * * * *